March 8, 1966  E. H. JACOBSEN  3,239,167
PASSENGER SEAT AND COMPARTMENT CONSTRUCTION
Filed Dec. 5, 1963  2 Sheets-Sheet 1
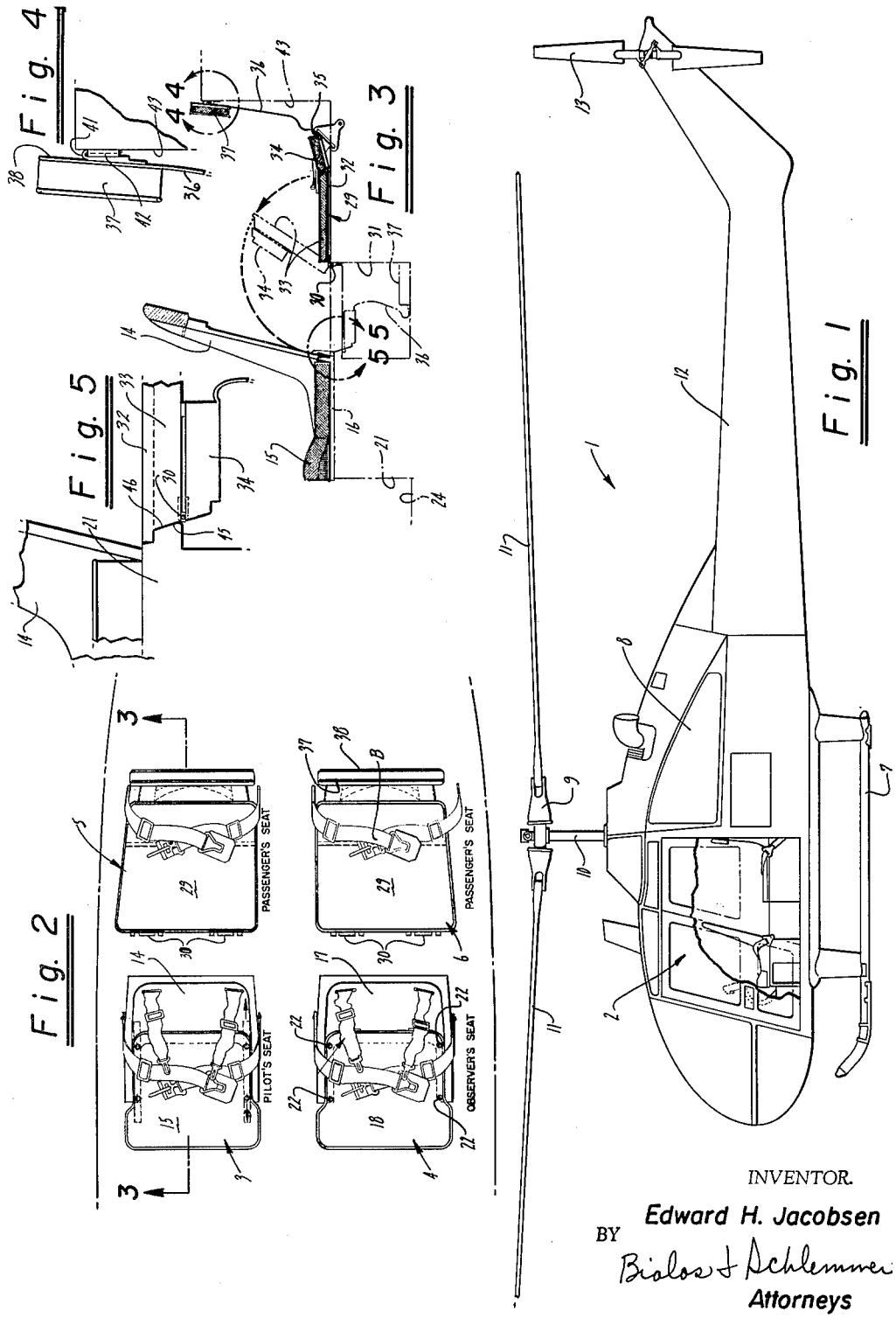
INVENTOR.
Edward H. Jacobsen
BY
Bialos & Schlemmer
Attorneys

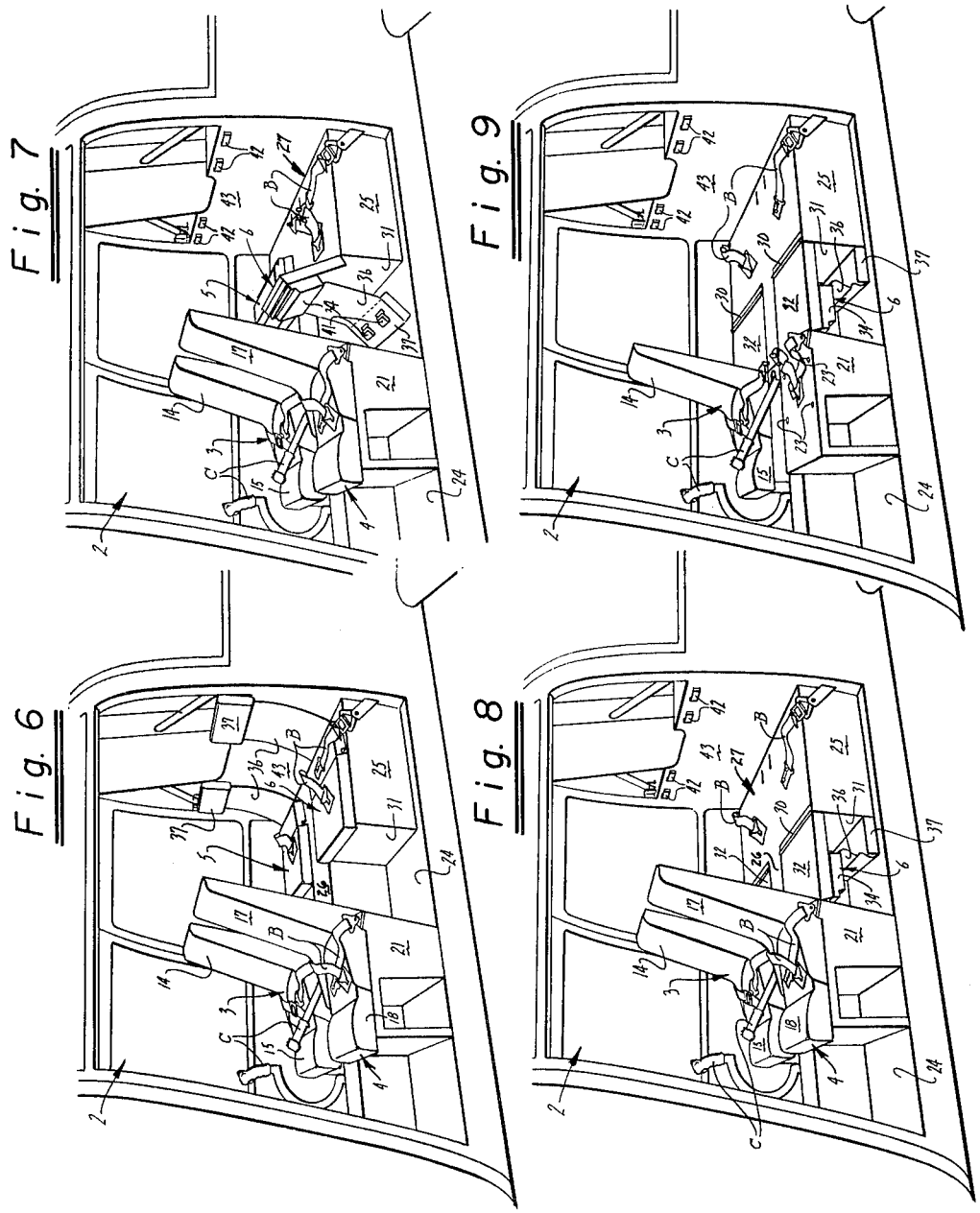

United States Patent Office 3,239,167
Patented Mar. 8, 1966

3,239,167
PASSENGER SEAT AND COMPARTMENT
CONSTRUCTION
Edward H. Jacobsen, Menlo Park, Calif., assignor, by mesne assignments, to Fairchild Hiller Corporation, Hagerstown, Md., a corporation of Maryland
Filed Dec. 5, 1963, Ser. No. 328,344
6 Claims. (Cl. 244—118)

This invention relates generally to vehicles. More particularly this invention relates to aircraft and to means provided therein to adapt said aircraft to accommodate passengers, cargo, or both. Still more particularly this invention relates to a helicopter type aircraft which includes retractable and removable seat constructions for passengers in its passenger compartment so that the compartment may be readily and rapidly modified to accommodate passengers or cargo in varying capacities to meet particular transportation needs.

This invention has particular utility in helicopters designed for military uses in that it allows the passenger compartment thereof to be modified rapidly to accommodate military cargo when required. But the advantages of this invention are equally well adapted for use in other than military helicopters and in aircraft other than helicopter type aircraft. Hereinafter, however, reference will be directed to employment of the subject invention in conjunction with a helicopter but its suitability for use in other vehicles also is contemplated within the scope of this invention.

From the foregoing it should be understood that objects of this invention include the provision of a retractable vehicle seat; the provision of a novel passenger and cargo compartment for a vehicle; the provision of a novel foldable seat construction for an aircraft; the provision in a helicopter type aircraft of a light weight, inexpensive retractable seat construction provided in an aircraft compartment which may readily be modified to accommodate passengers or cargo or a combination of both; and the provision of a multi-place aircraft passenger compartment which may readily be converted to a large capacity cargo compartment without requiring special tools or unnecessarily long time periods for conversion.

These and other objects will become evident from a study of the following description taken in conjunction with the accompanying drawings.

FIG. 1 is a side elevational view of a helicopter type aircraft with which the subject invention is well adapted for use.

FIG. 2 is a generally schematic plan view of the passenger compartment of the illustrated helicopter arranged to accommodate a plurality of passengers therein.

FIG. 3 is a vertical sectional view through the subject passenger compartment taken in the plane of line 3—3 of FIG. 2.

FIGS. 4 and 5 are views taken in the planes of lines 4—4 and 5—5 respectively of FIG. 3 illustrating details of construction of the subject retractable passenger seat.

FIGS. 6 through 9 are generally isometric views of the subject aircraft compartment illustrating various compartment arrangements designed to accommodate passengers and cargo in varying capacities.

In helicopter type aircraft, particularly helicopters designed for or used extensively in military operations, it is important that such aircraft be capable of accommodating equally well both passengers as well as cargo. Accordingly, emphasis is directed to both capabilities in the compartment of the subject helicopter.

The furnishings of the subject helicopter compartment which adapt the same to accommodate passengers are of light weight construction yet possess adequate features of comfort and safety which make the same fully suitable for supporting passengers in a normal sitting position. At the same time, the passenger accommodating furnishings require a minimum of time to permit conversion of the passenger compartment to a cargo compartment. No special tools are required for such conversion. After conversion in the manner to be described, a large flat cargo deck area is available for the stowage of cargo to be transported.

Further important features of the convertible passenger-cargo compartment of the subject helicopter reside in the fact that the furnishings thereof are of relatively low cost, are generally non-detachably secured in the aircraft compartment so that their loss is precluded, and are of simple yet sturdy construction well suited to accommodate passengers in comfortable upright standard sitting position. The invention disclosed herein obtains these objectives in the provision of light weight seat constructions provided in a convertible helicopter compartment.

The subject invention as illustrated in the drawings is shown in conjunction with a four place helicopter designed primarily to accommodate a pilot and three passengers, one of which may serve as an observer during military operations. The illustrated aircraft, generally designated 1, includes a convertible passenger-cargo compartment 2 in which are positioned in side by side relationship, a pilot's seat 3 and an observer's seat 4. Two retractable and foldable passenger seats 5 and 6 are provided at passenger stations generally directly behind the pilot's and observer's seats.

As seen in FIGS. 6–9, conventional cyclic and collective pitch pilot controls C are provided at the pilot's station in front of the pilot seat 3. If desired, a duplicate set of controls may be provided in front of seat 4 if the helicopter is designed to carry a co-pilot. Seat belts B of any suitable construction are provided in conjunction with each seat. Preferably the seat belts are connected directly to the framework or supporting structure of the aircraft as seen in the drawings.

The illustrated helicopter includes a skid type landing gear construction 7, a power source such as a suitable reciprocating or turbine engine (not shown) mounted in a compartment 8 behind the passenger compartment, and a rotor head construction 9 surmounting a rotor shaft 10 from which a plurality of rotor blades 11 extend in known fashion. Shaft 10 and its associated rotor are rotatable by the power source of the aircraft in known manner. A tail boom structure 12 projects rearwardly from the main portion of the helicopter chassis and a tail rotor 13 is mounted on the tail boom for rotation by the power source also in known fashion.

The pilot's seat 3 preferably is of the bucket type having an upright backrest 14 and a seat cushion 15 secured to the base 16 of the seat in any suitable fashion, such as by snap-type connector buttons. Preferably, so that the pilot's seat may be positioned to accommodate pilots of varying stature, the seat 3 is adjustable by any suitable means (not shown) so that the same may be moved closer or farther away from the pilot foot controls (not shown) as required. In distinction to the other passenger seats of the aircraft, the pilot's seat may be more or less permanently secured in the aircraft compartment in any suitable fashion in that the only time such seat need be removed is during maintenance or repair as required.

The observer's seat 4 preferably is of similar bucket construction defined by a back 17 and a cushion 18 similarly secured to the base of the seat. For purposes to be described, it is preferred that the observer's seat be separable from its support and removable as a unit from the compartment without requiring substantial time consumption, complicated procedures, or special tools. To this end, as seen in the illustrated embodiment in FIGS. 2 and 9, the observer's seat is held in place to its associated seat support 21 by a plurality of removable bolts 22 which extend through the base of the seat and are threadably received in threaded bores 23 provided in the seat support 21.

Access to the observer's seat holddown bolts 22 may be had by lifting the associated seat cushion 18 which may be snapped or otherwise held in place to the seat base as described above. Thus, upon removal of the bolts from their bores 23 formed in the seat support 21, the observer's seat may be removed as a unit to accommodate cargo adjacent the pilot if required.

As noted earlier, each of the passenger accommodating positions in the passenger compartment is provided with safety seat belts. However, as noted from FIG. 9, upon removal of the observer's seat 4, the seat belts provided in conjunction therewith, which are secured directly to the seat support 21, remain available for use as cargo holddown means. This same feature is true of the other seat structures to be described although, as also illustrated in FIG. 9, if preferred, some or all of the seat belts may be removed when the passenger compartment is converted to accommodate cargo.

The support 21 for the observer's seat is elevated above the floorboards 24 of the compartment to provide a footwell in front of the observer's seat. This elevated seat support 21 cooperates with a similar seat support beneath the pilot's seat 3 and with a similar seat support 25 for the retractable passenger seats 5 and 6 which extends transversely of the aircraft behind the observer's seat and pilot's seat as best seen in FIG. 9. The tops of these respective seat supports lie in a common substantially flat plane and are interconnected with each other by means of a longitudinally extending deck section 26 which extends forwardly from the rear seat support 25 to join with the pilot's and observer's seats. It is the top surface of these various seat supports and section 26 which together combine to define a flat cargo deck surface, generally designated 27, for the purpose to be described. The rear seat support 25 and longitudinal section 26 provide a generally T-shaped deck surface with side by side seat supporting portions at the rear end. The various supports for the various seats in the subject compartment may be attached to the floorboards 24 of the helicopter or to its chassis in any suitable manner by suitable means, not shown.

Positioned behind the pilot's and observer's seats in the illustrated helicopter compartment are the retractable passenger seats previously designated 5 and 6. As shown in FIGS. 6 through 9, these passenger seats are designed to be moved from the passenger accommodating position shown in FIG. 6 to the retracted and folded position shown in FIG. 9 in which the passenger seats cooperate with the deck 27 described previously to provide an enlarged substantially smooth deck area for the accommodation of cargo. As also seen in FIG. 9, the size of the cargo area provided when passenger seats 5 and 6 are retracted may further be increased by removing the observer's seat 4 in the manner described previously.

The construction of the subject passenger seats 5 and 6 is extremely simple so that they may easily and rapidly be converted from the passenger accommodating position to the cargo accommodating position. Each of the illustrated passenger seats comprises a rigid base 29 which is hingedly connected by suitable hinge means 30 to the front edge of the rear seat support 25 adjacent the footwells 31 which separate the rear seat support from the observer and passenger seat supports. The passenger seat base preferably is defined by a generally rigid metal or wooden plate member 32 to which is secured in any suitable fashion a seat cushion 33 as seen in FIG. 3. Preferably the passenger seat base is formed of two hingedly interconnected sections, the second or rearward section 34 of which is connected to the first or forward section by any suitable means, such as by the fabric which covers the seat cushion material as seen in FIG. 3. The rearward seat section 34 also has a rigid supporting plate 35 underlying its cushion as seen in FIG. 3.

Integrally connected with the rearward seat section 34 is the backrest portion of the seat which, in the illustrated embodiment, comprises a flexible web 36 of any suitable material, such as canvas, nylon, or the like. At its upper end, this flexible backrest web is secured to a padded backrest cushion 37 which is mounted on a backrest supporting plate 38 as perhaps best seen in FIG. 4.

Projecting from and secured to the back of the supporting plate 38 are one or more hook members 41 which are receivable in eye members 42 secured to the rear bulkhead 43 of the aircraft compartment as perhaps best seen in FIGS. 7, 8 and 9. This hook and eye arrangement provides cooperable means for supporting the backrest portion of the retractable passenger seats when the compartment is adapted to accommodate human passengers.

When it is desired to modify the compartment to receive cargo, it is merely necessary to raise up on the backrest cushion 37 to disengage the hook and eye arrangement shown. When this has been accomplished it is a simple matter to position the passenger seat in its retractable position by pivoting the seat base 29 as a unit about its associated hinges 30 so that the seat base is inverted to overlie and close off the footwell 31 between the passenger seat and the observer's or pilot's seat in front thereof. Due to space considerations in helicopters generally there is only limited space provided for the footwell. Thus, generally the seat base 29 defined by the two hinged sections of the seat is of larger dimension than the footwell. Thus, the two foldable sections of the seat base which are interconnected by the fabric covering of the seat cushion may be positioned as shown in FIGS. 3, 7, 8 and 9 so that the rearward foldable section of the seat base underlies the front section thereof and is received in the seat well with the backrest portion of the seat resting on the floorboards of the aircraft in the footwell.

Referring to FIG. 5, preferably the rigid plate 32 of the front seat section is provided with a projecting lip 45 which is engageable with a suitable supporting ledge 46 provided on the rear edge of the seat support 21 for the observer's seat. A similar ledge is provided in the support for the pilot's seat. Thus, the rigid plate 32 and the pilot seat support 21 cooperate to cover over the footwell and thereby define an extension of the generally planar cargo supporting deck in the manner described.

It should be understood that, although as shown in FIG. 9, the observer's seat may be removed to provide an extra large cargo space, the observer's seat also may be left in place as shown in FIG. 8 if a cargo space of less size is required.

As noted previously, when the passenger seats are retracted, the seat belts normally employed for safety of the passengers may be utilized for cargo holddowns.

With the subject aircraft, although not specifically illustrated herein, it is preferred that the passenger doors positioned at opposite sides of the passenger compartment in line with the rear passenger seats are slidable or removable. Thus, cargo of a length too great to be accommodated wholly internally of the compartment may be positioned partially in the compartment with its opposite ends projecting laterally beyond the compartment through the door openings.

From the foregoing it should be understood that this invention relates to a passenger and cargo compartment for a helicopter type aircraft which may be readily and easily converted to accommodate the same for passengers or cargo or for both. Because the subject passenger seat construction is extremely simple in its details of construction, the same may be incorporated into a helicopter at minimum cost and without unduly increasing the weight of the aircraft. These features are particularly important in helicopter construction.

Having thus made a disclosure of this invention, reference is directed to the appended claims for the scope to be afforded thereto.

I claim:

1. An aircraft compartment construction comprising a plurality of stations for a pilot and passengers, said passenger stations being located behind said pilot station and having retractable seat constructions thereat adapted to support passengers in sitting position, said retractable seat constructions being supported in side by side relationship on a raised seat support having depressed footwells adjacent thereto between said passenger stations and said pilot station; each of said seat constructions comprising a rigid seat base hingedly connected with said seat support adjacent its associated footwell, said seat base being pivotal about its hinge connection relative to said support to overlie in inverted position and close off its associated footwell thereby forming an extension of said support and thereupon cooperating with said support in defining a flat cargo deck on which cargo may be stowed in said compartment when said seat construction is thus retracted, said seat construction also including a backrest portion having means thereon engageable with cooperable means in said compartment for maintaining said backrest portion in a generally upright position when said seat construction is positioned to receive a passenger, said backrest portion comprising a flexible web extending between said means thereon and said seat base which is pivotal with said seat base and is thereupon receivable in the associated footwell beneath said seat base when said seat construction is retracted.

2. The construction of claim 1 in which said cooperable means on each said seat backrest portion and in said compartment comprises a separable hook and eye arrangement which permits each said backrest portion to be rapidly disengaged and pivoted with said seat base.

3. The construction of claim 1 in which each said rigid seat base comprises two interconnected sections, one of said sections being dimensioned to close off its associated footwell with the other of said sections being receivable therebeneath in said footwell when such seat construction is retracted.

4. An aircraft compartment construction comprising a T-shaped deck surface having a longitudinally extending section and side by side passenger seat supporting portions adjacent an end thereof, a passenger seat support in front of each of said passenger seat supporting portions and a footwell therebetween, a seat base hingedly connected to each seat supporting portion at the front end thereof adjacent the associated footwell and at a side of the longitudinally extending deck section, each of said seat bases being adapted to rest on its seat supporting portion and being pivotal about its hinge connection from the position of rest on its seat supporting portion to an inverted position extending between such seat supporting portion and a front passenger seat support to overlie and close off the associated footwell and form a continuation of such seat supporting portion and said longitudinally extending deck section to accommodate cargo.

5. The aircraft compartment construction of claim 4 wherein each seat base comprises a hingedly connected section adjacent the end thereof opposite its hinge connection with the associated seat supporting portion, and which is foldable in the inverted position of the base to be received in the associated footwell.

6. The aircraft compartment construction of claim 4 wherein a flexible backrest is connected to the end of each seat base opposite its hinge connection with the associated seat supporting portion; the backrest being provided with means for detachably connecting it in upright position to a portion of the aircraft, and when detached and the base inverted the backrest is receivable in the associated footwell.

References Cited by the Examiner

UNITED STATES PATENTS

| 2,774,552 | 12/1956 | Glad | 244—17.11 |
| 2,997,335 | 8/1961 | May | 296—66 |
| 3,097,881 | 7/1963 | Aguilar | 296—66 |
| 3,151,906 | 10/1964 | Roberts | 296—66 |

FOREIGN PATENTS

| 878,015 | 9/1961 | Great Britain. |
| 916,746 | 1/1963 | Great Britain. |

MILTON BUCHLER, *Primary Examiner.*

FERGUS S. MIDDLETON, *Examiner.*